United States Patent
Dive-Reclus et al.

(10) Patent No.: US 7,882,352 B2
(45) Date of Patent: Feb. 1, 2011

(54) SECURE MOBILE WIRELESS DEVICE

(75) Inventors: Corinne Dive-Reclus, Herts (GB); Jonathan Harris, London (GB); Dennis May, London (GB)

(73) Assignee: Nokia Corporation (FI)

( * ) Notice: Subject to any disclaimer, the term of this patent is extended or adjusted under 35 U.S.C. 154(b) by 892 days.

(21) Appl. No.: 10/515,740

(22) PCT Filed: May 28, 2003

(86) PCT No.: PCT/GB03/02311

§ 371 (c)(1),
(2), (4) Date: Nov. 24, 2004

(87) PCT Pub. No.: WO03/100581

PCT Pub. Date: Dec. 4, 2003

(65) Prior Publication Data

US 2006/0053426 A1    Mar. 9, 2006

(30) Foreign Application Priority Data

May 28, 2002  (GB) ................................ 0212314.9

(51) Int. Cl.
*H04L 29/06* (2006.01)
(52) U.S. Cl. ............................ 713/164; 713/2; 713/165; 713/167; 713/189; 726/2; 726/16; 726/22; 726/26; 717/168; 717/174; 719/327; 719/328
(58) Field of Classification Search ............... 719/328, 719/327; 726/16, 27, 1, 22, 2, 14, 26; 717/168, 717/121; 713/187, 189, 100, 167, 194, 1, 713/152, 172, 176
See application file for complete search history.

(56) References Cited

U.S. PATENT DOCUMENTS

| | | | | | |
|---|---|---|---|---|---|
| 5,670,950 | A | * | 9/1997 | Otsuka | 455/411 |
| 5,841,869 | A | * | 11/1998 | Merkling et al. | 713/164 |
| 5,901,312 | A | * | 5/1999 | Radko | 718/104 |
| 6,026,402 | A | * | 2/2000 | Vossen et al. | 707/9 |
| 6,066,181 | A | * | 5/2000 | DeMaster | 717/148 |

(Continued)

FOREIGN PATENT DOCUMENTS

EP    0 813 188 A    12/1997

(Continued)

OTHER PUBLICATIONS

Jonathan Allin, Wireless Java for Symbian Devices, Symbian Press, 2001, pp. 1-3.*

(Continued)

*Primary Examiner*—Nasser Moazzami
*Assistant Examiner*—Shanto M Abedin
(74) *Attorney, Agent, or Firm*—Alston & Bird LLP (57) ABSTRACT

A secure mobile wireless device in which executable code to be installed on the device is assigned a set of capabilities which define the protected resource(s) on the device which it can access. Hence, the present invention takes the idea of capabilities (known in the context of defining the capabilities or access privileges of different users in a multi-user system) and applies it to defining the capabilities or access privileges of different native executable code for secure, single-user mobile wireless devices.

18 Claims, 3 Drawing Sheets

U.S. PATENT DOCUMENTS

| | | | |
|---|---|---|---|
| 6,169,897 B1 * | 1/2001 | Kariya | 455/456.3 |
| 6,185,666 B1 * | 2/2001 | Murray et al. | 711/173 |
| 6,216,014 B1 | 4/2001 | Proust et al. | |
| 6,219,787 B1 * | 4/2001 | Brewer | 713/167 |
| 6,256,393 B1 * | 7/2001 | Safadi et al. | 380/232 |
| 6,356,752 B1 * | 3/2002 | Griffith | 455/406 |
| 6,609,199 B1 * | 8/2003 | DeTreville | 713/172 |
| 6,651,171 B1 * | 11/2003 | England et al. | 713/193 |
| 6,658,573 B1 * | 12/2003 | Bischof et al. | 726/16 |
| 6,721,804 B1 * | 4/2004 | Rubin et al. | 709/246 |
| 6,775,779 B1 * | 8/2004 | England et al. | 726/26 |
| 6,904,523 B2 * | 6/2005 | Bialick et al. | 713/156 |
| 6,917,976 B1 * | 7/2005 | Slaughter et al. | 709/226 |
| 6,947,943 B2 * | 9/2005 | DeAnna et al. | 707/100 |
| 7,024,555 B2 * | 4/2006 | Kozuch et al. | 726/22 |
| 7,028,305 B2 * | 4/2006 | Schaefer | 719/310 |
| 7,103,598 B1 * | 9/2006 | Clement | 707/10 |
| 7,188,347 B2 * | 3/2007 | Arroyo et al. | 719/319 |
| 7,526,785 B1 * | 4/2009 | Pearson et al. | 725/31 |
| 2001/0034711 A1 * | 10/2001 | Tashenberg | 705/52 |
| 2002/0023032 A1 * | 2/2002 | Pearson et al. | 705/35 |
| 2003/0065947 A1 * | 4/2003 | Song et al. | 713/201 |
| 2003/0177371 A1 * | 9/2003 | Rothrock et al. | 713/189 |
| 2003/0186722 A1 * | 10/2003 | Weiner | 455/558 |
| 2003/0236821 A1 * | 12/2003 | Jiau | 709/203 |
| 2004/0043770 A1 * | 3/2004 | Amit et al. | 455/450 |
| 2004/0078427 A1 * | 4/2004 | Gil et al. | 709/203 |
| 2005/0066219 A1 * | 3/2005 | Hoffman et al. | 714/4 |
| 2005/0166064 A1 * | 7/2005 | Dive-Reclus et al. | 713/189 |
| 2005/0204127 A1 * | 9/2005 | Dive-Reclus et al. | 713/152 |
| 2005/0216907 A1 * | 9/2005 | Dive-Reclus | 717/174 |
| 2008/0066187 A1 * | 3/2008 | Dive-Reclus et al. | 726/27 |

FOREIGN PATENT DOCUMENTS

| | | |
|---|---|---|
| EP | 0813133 A2 * | 12/1997 |
| EP | 0 853 279 | 7/1998 |
| EP | 1 132 796 | 9/2001 |
| EP | 1132796 A1 * | 9/2001 |
| EP | 1 132 796 A | 12/2001 |
| EP | 1 318 452 | 6/2003 |
| GB | 2 380 901 | 4/2003 |
| GB | 2380901 A * | 4/2003 |
| WO | WO 0018162 * | 3/2000 |
| WO | WO 00/77633 | 12/2000 |
| WO | WO 01/33867 | 5/2001 |
| WO | WO 02/48884 | 6/2002 |
| WO | WO 02/097620 | 12/2002 |

OTHER PUBLICATIONS

McIlroy et al, Multilevel Security in the UNIX Tradition, AT&T Bell Laboratories, 1992, pp. 1-19.*

William Daugherty et al, Information Unleashed: The Coming of Wireless Data, Journal article, The Mckinsey Quarterly, pp. 1-3, No. 2, 1999.*

Spyridon Panagiotakis et al, Integrated Generic Architecture for Flexible Service Provision to Mobile Users, pp. B 40-44, IEEE, 2001.*

Fredrik Hacklin, Towards the Ubiquitous Office Vision with focus on Mobile Data Synchronization, pp. 1-35, Helsinki, Mar. 2001.*

Arto Kettula, Security COmparison of Mobile OSes, Helsinki University of Technology, pp. 1-14, 2000.*

Search Report, dated Oct. 15, 2003, issued in related UK Application No. GB 0312191.0.

* cited by examiner

SECURE MOBILE WIRELESS DEVICE

CROSS REFERENCE TO RELATED APPLICATIONS

This application claims the priority of PCT/GB03/02311 filed May 28, 2003 and British Application GB 0212314.9 filed on May 28, 2002, the contents of which are hereby incorporated by reference.

FIELD OF THE INVENTION

This invention relates to a secure mobile wireless device; in particular it relates to a new approach to platform security for mobile wireless devices which protects key operating system resources from harmful access.

DESCRIPTION OF THE PRIOR ART

Platform security covers the philosophy, architecture and implementation of platform defence mechanisms against malicious or badly written code. These defence mechanisms prevent such code from causing harm. Malicious code generally has two components: a payload mechanism that does the damage and a propagation mechanism to help it spread. They are usually classified as follows:
  Trojan horse: poses as a legitimate application that appears benign and attractive to the user.
  Worm: can replicate and spread without further manual action by their perpetrators or users.
  Virus: Infiltrates legitimate programs and alters or destroys data.

Security threats encompass (a) a potential breach of confidentiality, integrity or availability of services or data in the value chain and integrity of services and (b) compromise of service function. Threats are classified in the following categories:
1. Threats to confidentiality and integrity of data. Examples: Get user's password; corrupt files.
2. Threats to confidentiality and integrity of services. Examples: Use bandwidth from phone network subscriber without paying for it; repudiate transaction with network service provider.
3. Threats to availability of service (also called denial of service). Examples: Prevent the user from sending a text message; prevent the user from accepting a telephone call.

Hence, mobile wireless devices offer very considerable challenges to the designer of a security architecture. A conventional approach typically operates by first of all determining whether the code (e.g. an application) is sufficiently trustworthy to be installed and then subsequently protecting the platform from errant behaviour once it is installed. In terms of determining trust, third party applications can be categorised according to the degree of trust associated with their authors. Hence, it is known to allow applications to be automatically installed on a device only if they can present a valid digital certificate issued by an acceptable Certificate Authority (CA).

Digital certificates are however only just becoming widespread; prior to their adoption, a primary platform security mechanism was to grant privileges to a user rather than to an application. At run time, the code being executed by the user is granted all his privileges. At install time, only designated users could install sensitive software. This meant that potentially harmful code could be vetted by an expert administrator prior to installation. Many well known operating systems adopt this approach to platform security—e.g. Unix-based operating systems.

Platform security based on giving different users different access privileges is not relevant however for mobile wireless devices for the simple reason that this category of product is single user. It is a personal device, typically a 'smartphone', enhanced mobile telephone, PDA or other personal, portable computing device. Furthermore, the single user is very likely not to be expert in computing and hence cannot reliably assess the risk of installing and running code. With mobile wireless devices, the key threats that a platform security model tries to address are unauthorised access to user data and to system services, in particular the phone stack. The phone stack is especially important because it controls a permanent data connection to the phone network; mobile commerce, mobile banking etc. will be performed using the phone stack and (as noted above) losing control over it to malicious or badly written code exposes the device owner to potentially very significant financial damage.

To date, there have been no effective proposals for platform security for mobile wireless devices.

SUMMARY OF THE PRESENT INVENTION

In a first aspect of the present invention, there is a secure mobile wireless device for a single user in which native executable code is written to include a set of capabilities which define the protected resource(s) on the device which it can access, such that a native process running on the device and providing the protected resource(s) will only grant access to the native executable code if doing so is permitted by the capabilities included within the native executable code, as determined during run time, by that particular native process. Native code is composed of instructions directly executed by a CPU on a device.

Hence, the present invention takes the idea of capabilities (known in the context of defining the capabilities or access privileges of different users in a multi-user system) and applies it to defining the capabilities or access privileges of different native executable code for secure, single-user mobile wireless devices.

An implementation of the present invention can be thought of as firewall protection of key operating system servers through the use of capability-based access control as applied to native executable code. Each capability may grant access to a specific API (or range of APIs), a file or any other applicable resource(s). Each executable (e.g. program (EXEs), or shared, static or dynamic libraries (DLLs)) contains the capabilities it has been granted at installation time. Each executable is permanently stored in a location only accessible to the Trusted Computing Base (kernel, loader, file server and software installer, see Detailed Description section 1.1) to preserve the integrity of the capabilities assigned to the executable. Once an executable is invoked, the loader will load the executable either to create a new process or to load the library code into an existing process. When creating a new process, the capabilities of this process are equal to the capabilities granted to the program. Based on this set of capabilities, the loader controls which libraries can be loaded into n process. For each client-server communication, the kernel will pass the client capabilities to the server. Therefore, the server can fully trust the client capabilities, as they are not passed/approved by it but by a process part of the Trusted Computing Base, e.g. the kernel. The server can decide either to process the call or to reject it.

Preferably, the capability model is deliberately limited to a small number of capabilities. System capabilities are mandatory and control access to the operating system kernel, file system and system data. They guarantee the integrity of the 'Trusted Computing Environment' (or TCE—see Detailed Description at 1.2). The way they are controlled cannot be modified by the user of the device and they are never exposed to them. Other kinds of capability are discretionary, as they are meaningful enough to average users to let them decide whether or not to grant some of them to code they have installed. These capabilities are categorised are follow:

Root (mandatory) "Full access to all files—Can modify capabilities associated with executables"
  Used by the Trusted Computing Base only.
System capabilities (mandatory)
  As examples, we may define:
  WriteSystemData allows a process to modify configuration system data.
  CommDD grants access to all communication and ethernet card device drivers.
User-exposed capabilities (discretionary)
  As examples, we may define:
  PhoneNetwork "Can access phone network services (and potentially spend user money)"
  ReadUserData. "Can read the device users private information"

Other aspects of the invention are particularise in the appended claims.

BRIEF DESCRIPTION OF THE DRAWINGS

The present invention will be described with reference to the accompanying drawings, in which.

DETAILED DESCRIPTION

The present invention will be described with reference to the security architecture of the Symbian OS object oriented operating system, designed for single user wireless devices. The Symbian operating system has been developed for mobile wireless devices by Symbian Ltd, of London, United Kingdom.

The basic outline of the Symbian OS security architecture is analogous to a medieval castle defences. In a similar fashion it employs simple and staggered layers of security above and beyond the installation perimeter. The key threats that the model is trying to address are those that are linked with unauthorised access to user data and to system services, in particular the phone stack The phone stack is especially important in the context of a smart phone because it will be controlling a permanent data connection to the phone network. There are two key design drivers lying behind the model:

Firewall protection of key system resources through the use of capability-based access control.
Data partitioning which creates a protected part of the file system which standard software is not able to access.

The main concept of the capability model described below is to control what a process can do rather than what a user can do. This approach is quite different to well-known operating systems as Windows NT and Unix. The main reasons are:

The very nature of Symbian OS is to be mono-user.
Symbian OS provides services through independent server processes. They always run and are not attached to a user session. As long as power is supplied, Symbian OS is always on even if no user is logged on.

Symbian OS is aimed to be used in devices used by a large public with no technology knowledge. When installing software, the user may not have the skills to decide what permissions to grant to an application. Furthermore, with always-connected devices, the consequences of a wrong or malevolent decision may impact a domain much larger than the device itself.

A remarkable point of this invention is that the use of cryptography has been deliberately excluded from the kernel and the loader executables are not signed, capabilities are not stored encrypted or signed. That has been possible because data partitioning provides a secure storage area for executables. It allows the system to treat executables from ROM (built in the device) the same way as code from RAM (installed by the user) without compromising either on security or performance. Therefore any misuse or exploit of device manufacturer code is restricted to the capabilities assigned to this code. As is well known, the code is stored on a computer-readable medium, such as a hard drive, CD-ROM, floppy disk, RAM memory, ROM memory, USB drive, or the like.

1 Trusted Computing Platform 1.1 Trusted Computing Base

A trusted computing base (TCB) is a basic architectural requirement for robust platform security. The trusted computing base consists of a number of architectural elements that cannot be subverted and that guarantee the integrity of the device. It is important to keep this base as small as possible and to apply the principle of least privilege to ensure system servers and applications do not have to be given privileges they do not need to function. On closed devices, the TCB consists of the kernel, loader and file server, on open devices the software installer is also required. All these processes are system-wide trusted and have therefore full access to the device. This trusted core would run with a "root" capability not available to other platform code (see section 2.1).

There is one other important element to maintain the integrity of the trusted computing base that is out of the scope of this invention, namely the hardware. In particular, with devices that hold trusted computing base functionality in flash ROM, it is necessary to provide a secure boot loader to ensure that it is not possible to subvert the trusted computing base with a malicious ROM image.

1.2 Trusted Computing Environment

Beyond the core, other system components would be granted restricted orthogonal system capabilities and would constitute the Trusted Computing Environment (TCE); they would include system servers such as phone and window servers . . . . For instance the window server would not be granted the capability of phone stack access and the phone server would not be granted the capability of direct access to keyboard events. It is strongly recommended to give as few system capabilities as possible to a software component to limit potential damage by any misuse of these privileges.

The TCB ensures the integrity of the full system as each element of the TCE ensures the integrity of one service. The TCE cannot exist without a TCB but the TCB can exist by itself to guarantee a safe "sand box" for each process.

2 Process Capabilities

Figure 3:
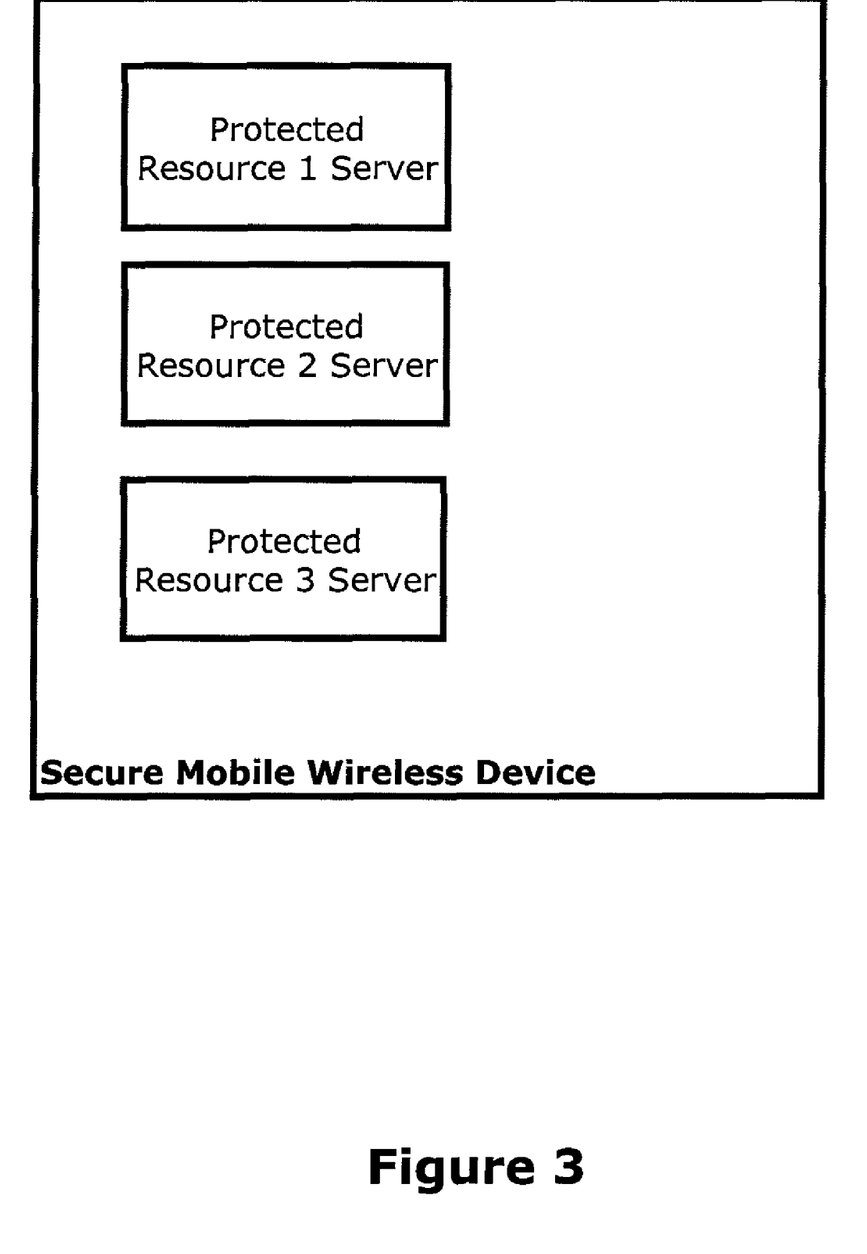
FIG. 3 illustrates the use of corresponding servers on the device for each protected resource.

A capability can be thought of as an access token that corresponds to a permission to undertake a sensitive action. The purpose of the capability model is to control access to sensitive system resources. The most important resource that requires access control is the kernel executive itself and a system capability (see section 2.1) is required by a client to access certain functionality through the kernel API. All other resources reside in user-side servers accessed via IPC [Inter Process Communication]. A small set of basic capabilities would be defined to police specific client actions on the servers (see FIG. 3). For example, possession of a make calls capability would allow a client to use the phone server. It would be the responsibility of the corresponding server to police client access to the resources that the capability represents. Capabilities would also be associated with each library (DLL) and program (EXE) and combined by the loader at run time to produce net process capabilities that would be held by the kernel. For open devices, third party software would be assigned capabilities either during software installation based on the certificate used to sign their installation packages or post software installation by the user, as detailed in section 3. The policing of capabilities would be managed between the loader, the kernel and affected servers but would be kernel-mediated through the IPC mechanism.

The key features of the process capability model are:

It is primarily focused around system servers and client-server IPC interactions between these entities.

Capabilities are associated with processes and not threads. Threads in the same process share the same address space and memory access permissions. This means that any data being used by one thread can be read and modified by all other threads in the same process.

The policing of the capabilities is managed by the loader and kernel and through capability policing at the target servers. The kernel IPC mechanism is involved in the latter.

When the code is not running, capabilities are stored inside of libraries and programs. Capabilities stored in libraries and programs are not modifiable, as they would be stored during installation in a location that is only accessible by the Trusted Computing Base.

Not all servers would have to handle client capabilities. Servers would be responsible for interpreting capabilities as they wish.

The only cryptography involved in this scheme might be at the software installation stage where certificates would be checked off against a suitable root certificate (refer to sub-section 3)

2.1 System Capabilities: Protecting the Integrity of the Device

Root. "Full access to all files—Can modify capabilities associated with executables"

"Root" capability—Used by the Trusted Computing Base only, it gives full access to all files in the device.

System capabilities

Some system servers require some specific access to the Trusted Computing Base. Because of the object-oriented implementation of Symbian OS, the kind of resources required by a system server is most of the time exclusive to it. Therefore, one system server would be granted some system capability that would be orthogonal to those required by another. For instance, the window server would be granted access to keyboard and pen events issued by the kernel but it would not have permission to access the phone stack In the same way, the phone server would be granted access to the phone stack but would not have permission to collect events from the kernel. As examples, we can name:

| | |
|---|---|
| WriteSystemData | Allows modification of configuration system data |
| CommDD | Grants access to all communication and Ethernet card device drivers. |
| DiskAdmin | Can perform administration task on the disk (reformat, rename a drive, . . .). |

2.2 User-Exposed Capabilities: Mapping Real-World Permissions

The process of generating capabilities can be difficult. One has first to identify those accesses that require policing and then to map those requirements into something that is meaningful for a user. In addition, more capabilities means greater complexity and complexity is widely recognised as being the chief enemy of security. A solution based on capabilities should therefore seek to minimise the overall number deployed. The following capabilities map fairly broadly onto the main threats which are unauthorised access to system services (eg. the phone stack) and preserving the confidentiality/integrity of user data.

PhoneNetwork. "Can access phone network services and potentially spend user money"
  "Make telephone calls"
  "Send short text messages".
WriteUserData. "Can read and modify users private information"
  "Add a contact".
  "Delete an appointment".
ReadUserData. "Can read users private information"
  "Access contacts data".
  "Access agenda data".
LocalNetwork. "Can access local network"
  "Send Bluetooth messages".
  "Establish an IR connection"
  "Establish an USB connection"
Location. "Can access the current location of the device"
  "Locate the device on a map"
  "Display closest restaurants and cinema"

It is necessary to make a distinction between PhoneNetwork and LocalNetwork because it is possible to transmit information across a network without spending any money (eg. Bluetooth piconet). This kind of access may be a very useful third party software enabler but nonetheless represents a local way of leaking sensitive information via a trojan horse so it must be protected with a capability, albeit LocalNetwork PhoneNetwork if granted by the user, would allow trojans seeking to use the phone network as their exit route; that is potentially much more damaging and hence the blunt warning in its description. Root and system capabilities are mandatory, if not granted to an executable, the user of the device cannot decide to do it. Their strict control ensures the integrity of the Trusted Computing Platform. However the way servers check user-exposed capabilities or interpret them may be fully flexible and even user-discretionary.

Figure 1:
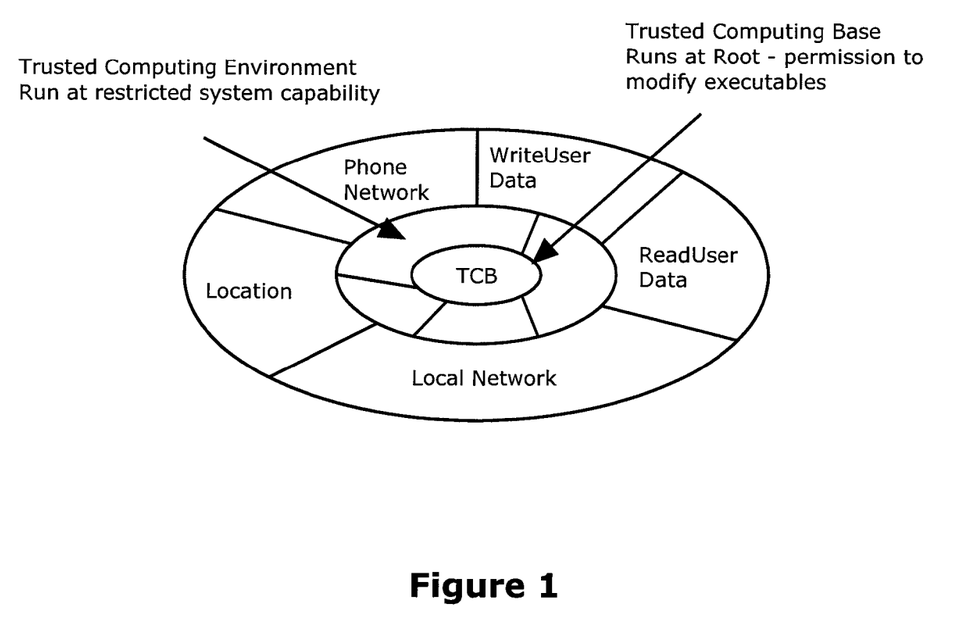
FIG. 1 shows the Run time processes, system capability rings and user visible capability groupings for an implementation.

FIG. 1 shows the Run time processes, system capability rings and user visible capability groupings.

2.3 Assigning Capabilities to a Process

The association of a run-time capability with a process involves the loader. In essence, it transforms the static capability settings associated with individual libraries and programs into a run-time capability that the kernel holds and can be queried through a kernel user library API. The loader applies the following rules:

Rule 1. When creating a process from a program, the loader assigns the same set of capabilities as its program's.

Rule 2. When loading a library within an executable, the library capability set must be greater than or equal to the capability set of the loading executable. If not true, the library is not loaded into the executable.

Rule 3. An executable can load a library with higher capabilities, but does not gain capabilities by doing so.

Rule 4. The loader refuses to load any executable not in the data caged part of the file system reserved to the TCB.

It has to be noted that:

Libraries' capabilities are checked at load time only. Beyond that, all code contained in libraries is run freely and is assigned the same capability set as the program it runs into when initiating some IPC calls.

For ROM images with execution in place, the ROM build tool resolves all symbols doing the same task as the loader at runtime. Therefore the ROM build tool must enforce the same rules as the loader when building a ROM image.

These rules

Prevent malware from being loaded in sensitive processes, for example, a plug-in in a system server Encourage encapsulation of sensitive code inside processes with no possible bypass The examples below show how these rules are applied in the cases of statically and dynamically loaded libraries respectively.

2.3.1 Examples for Linked DLLs

The program P.EXE is linked to the library L1.DLL.
The library L1.DLL is linked to the library L0.DLL.
Case 1:
P.EXE holds Cap1 & Cap2
L1.DLL holds Cap1 & Cap2 & Cap3
L0.DLL holds Cap1 & Cap2.
Process P cannot be created, the loader fails it because L1.DLL cannot load L0.DLL. Since L0.DLL does not have a capability set greater than or equal to L1.DLL, Rule 2 applies.
Case 2:
P.EXE holds Cap1 & Cap2
L1.DLL holds Cap1 & Cap2 & Cap3
L0.DLL holds Cap1 & Cap2 & Cap3 & Cap4
Process P is created, the loader succeeds it and the new process is assigned Cap1 & Cap2. The capability of the new process is determined by applying Rule 1; L1.DLL cannot acquire the Cap4 capability held by L0.DLL, and P1.EXE cannot acquire the Cap3 capability held by L1.DLL as defined by Rule 3.

2.3.2 Examples for Dynamically Loaded DLLs

The program P.EXE dynamically loads the library L1.DLL.
The library L1.DLL then dynamically loads the library L0.DLL.
Case 1:
P.EXE holds Cap1 & Cap2
L1.DLL holds Cap1 & Cap2 & Cap3
L0.DLL holds Cap1 & Cap2
Process P is successfully created and assigned Cap1 & Cap2.
When P requests the loader to load L1.DLL & L0.DLL, the loader succeeds it because P can load L1.DLL and L0.DLL. Rule 2 does apply here the loading executable being the process P not the library L1.DLL: the IPC load request that the loader processes is sent by the process P. The fact that the call is within L1.DLL is here irrelevant. Rule 1 & 3 apply as before and P does not acquire Cap3 by loading L1.DLL Case 2:
P.EXE holds Cap1 & Cap2
L1.DLL holds Cap1 & Cap2 & Cap3
L0.DLL holds Cap1 & Cap2 & Cap4
Process P is successfully created and assigned Cap1 & Cap2. When P requests the loader to load L1.DLL & L0.DLL, the loader succeeds it because P can load L1.DLL and L0.DLL. Once again, Rule 2 does apply with P as the loading executable rather than L1.DLL, while Rule 3 ensures P acquires neither Cap3 nor Cap4.

2.4 Protecting System Servers Names

To prevent impersonation of critical servers, a specific system capability ProtServ has been created. When a process is granted this capability, it can register as a 'Protected Server' to the kernel under a specific name format, for instance starting by '!'. The kernel will reject any name registration starting by '!' if the calling process does not have ProtServ. However all servers from the protected server community must be trusted not to impersonate another server of this community. It is believed this simple mechanism will achieve a good enough level of security providing that ProtServ is granted only to a small set of services. If two server domains were proven not to be enough, nothing would prevent in the future adding a new domain linked to a new capability and name format.

2.5 Firewall-ing Symbian OS System Servers 2.5.1 Capability Permission Lifetime

With a kernel-mediated process capability model in place, specific policy decisions are delegated to the servers themselves. Each server would have to police itself and would do so differently—some would be more paranoid than others and may decide to check client capability settings per access or may refuse to allow access at all without the requisite capability bit set. Devolving security policy to a local decision at servers represents good abstraction as it means that security policy can be interpreted locally as desired. In addition, interpretation of the presence of the capability bit could be done in one of four ways, namely blanket permission, process permission, session permission and selective access permission.

From a user point of view, it has become more and more difficult to identify the lifetime of a process or a session. For instance, in most smart phones, when the user accesses her Agenda, she does not know if a new Agenda process has been created or if an existing one is being re-used. In the same way, she does not have any idea, when making a telephone call, if the telephone application has created a new session to the phone server or re-use the previous one. It is our belief that users can understand only two ways of granting capabilities: the blanket and the selective access permission.

In line with this, there would be two possible alternatives for interpretation of the presence of a user-exposed capability bit at capability-aware servers:

Blanket permission: Capability is granted as a one off act. If the capability is not present when the process is created, the request fails. All access requiring system capability will be policed this way.

Single action permission: Capability is checked upon each sensitive API call to the server. This means that on each access to the sensitive API call, a dialog box created by the server asks the user if they wish to grant that capability. However the capability only lasts for the duration of the corresponding sensitive API call.

The user perception of this kind of permission must not be confused with when a server will check a required capability. For instance, an application may be granted PhoneNetwork as blanket permission but the phone server will check PhoneNetwork capability at each relevant call made by this application as the kernel will send the client capability set at each IPC call anyway. But as the user will not be asked to make a decision (to grant or not to grant PhoneNetwork for this call), this security check is transparent to the user.

The advantages of this design are:
- To take immediately into account any modification of the process blanket set of permission
- To maintain the time of check as close to the time of use as possible (to avoid any TOCTOU (time of check-time of use flaws)
- To avoid the server storing capability-related information for a process.

3 Software Installer—Enhancing Perimeter Security

The software installer has to support the process capability model to determine what capabilities can genuinely be granted to a piece of code to be installed after manufacture time. There are many ways to do it and this invention does not mandate any. In the following sections, we explore different scenarios based on the existence of a Public Key Infrastructure to illustrate how someone may choose to do it and which issues should be considered.

The software installer may support three main scenarios:
- The [un]installation/revocation of trusted (signed) applications
- The [un]installation/revocation of untrusted (signed) applications
- The [un]installation/revocation of unsigned applications The trust distinction here is a function of the presence of a root certificate in the signing chain that corresponds to one of the root certificates stored on the device. In the next subsections, we examine these alternatives from a user perspective.

3.1 Installation of Trusted (Signed) Software

In this case, approved client applications would be checked by a recognised authority. Software would then be signed, along with a list of the capabilities it required, into installation packages. Capabilities that could be signed for would be system and user-exposed capabilities. The chain of certificates included with the software is terminated by a root CA known by the software installer, in which case the user can install the software safe in the knowledge that the root CA vouches for it. At install time, the software would be installed on the device without any user feedback, though on some devices it would be possible to examine the details of the signing certificate. Note that any third party software that sought system capability would be forced to go via this route.

3.2 Installation of Untrusted (Signed) Software

In this case, the third party software would not check out against any of the root certificates. The software is signed by an unknown root CA in which case the user would be presented with a warning but could just go ahead and install the software anyway after viewing the contents of the certificate. The software installer would throw up a user dialog at install time, which would offer the user the option of installing the application plus a list of the capabilities the application wished to request. Capabilities that could be granted via this route would be in the range of user-exposed capabilities. In other words, it would not be possible for users to grant system capability to signed software that did not check out against one of the root certificates on the device.

3.3 Installation of Unsigned Software

The scenario here would be similar to 3.2. Third parties would have to request capabilities with their installation package. Again, only user-exposed capabilities would be available via this route—it would not be possible for users to grant system capability to unsigned software.

Figure 2:
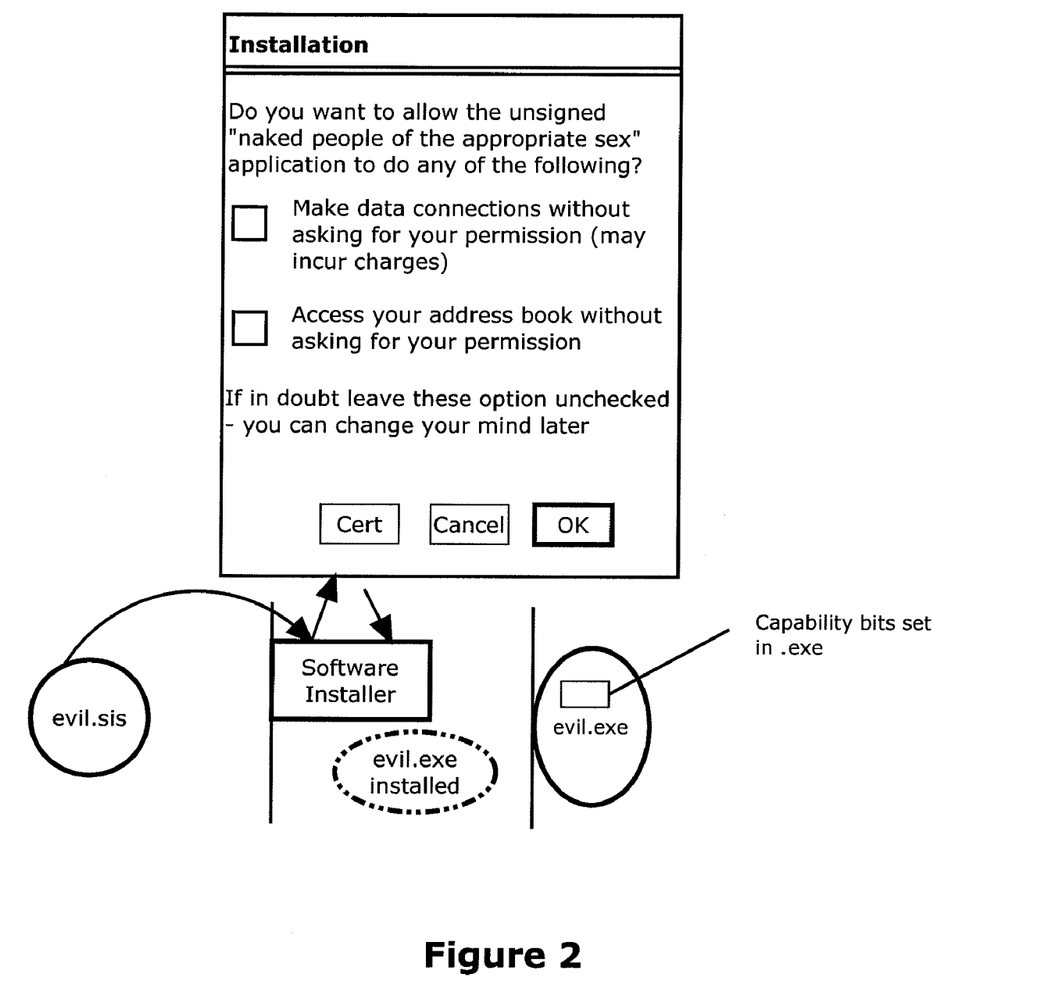
FIG. 2 illustrates a possible process of installation.

FIG. 2 illustrates a possible process of installation when it is wished to let the user make discretionary decisions about the policy to apply to either an unsigned application or a signed application the root-signing certificate of which didn't match against any of the device root certificates.

3.4 Control Panel for Revoking Capabilities

In case it is wished to let the user make discretionary security policy decisions after install time, a software installer control panel dialog would be required to provide access to the capability settings currently granted to various installed third party applications. The user would be able to view and optionally grant or revoke user-exposed capabilities for installed third party code. In addition, it would be possible to view a corresponding code signing certificate (if necessary). The following table illustrates what the control panel dialog might look like:

| Installed | PhoneNetwork | ReadUserData | WriteUserData | LocalNetwork | Certificate |
|---|---|---|---|---|---|
| Good.exe | Not granted | Granted | Not granted | Granted | Checked OK - click to view root signing cert |
| Bad.exe | Not granted | Not granted | Not granted | Not granted | Unsigned |

The invention claimed is:

1. An apparatus comprising at least one processor and a memory storing installed native executable code, the apparatus further comprising:
   a plurality of protected resources stored on said apparatus;
   a plurality of servers; and
   a trusted computing base having a kernel; wherein
   access to each said protected resource is provided by a corresponding server;
   the native executable code is assigned a set of capabilities which define the protected resource(s) on the apparatus which the native executable code can access;
   said corresponding servers are configured, with the at least one processor, to police access to said protected resource (s) on the basis of the capabilities assigned to the native executable code;
   the capabilities are stored in a location in the memory that is only accessible to the trusted computing base, wherein prior to install time, the executable code already contains the capabilities it has been granted, and wherein a loader is configured to refuse to load executables not permanently stored in the location in the memory which is only accessible to the trusted computing base; and the kernel is configured, for each client-server communication, to pass the client capabilities to said servers.

2. The apparatus of claim 1 in which one of said capabilities grants access to a specific Application Programming Interface (API) (or range of APIs), file or other operating system protected resource(s).

3. The apparatus of claim 1 in which the executable code is permanently stored in the location in the memory which is only accessible to the trusted computing base to preserve the integrity of the capabilities assigned to the executable code.

4. The apparatus of claim 3 in which a loader is configured to refuse to load executables not permanently stored in the location in the memory which is only accessible to the trusted computing base, to preserve the integrity of the system.

5. The apparatus of claim 1 in which said capabilities include system capabilities which are mandatory and control access to the kernel, file system and system data.

6. The apparatus of claim 1 in which, for a library to be loaded in an executable, the loader is configured to verify that the library is assigned a superset of the capabilities granted to the requesting executable.

7. The apparatus of claim 1 in which a capability is selected from a list of capabilities which comprise root capabilities, system capabilities and user-exposed capabilities.

8. The apparatus of claim 7 in which the user-exposed capabilities allow the following functions:
   (a) can spend subscribers money by using the phone network;
   (b) can read users private information;
   (c) can modify users private information;
   (d) can send information to a local network without spending subscribers money;
   (e) can know the device location.

9. The apparatus of claim 1 in which one of the servers comprises the kernel.

10. A method comprising:
   providing access to each of a plurality of protected resources stored on a device by a corresponding server, the corresponding server being one of a plurality of servers of the device;
   assigning native executable code a set of capabilities which define the protected resource(s) on the device which the native executable code can access;
   causing storage of the capabilities in a location that is only accessible to a trusted computing base having a kernel, wherein prior to install time, the executable code already contains the capabilities it has been granted, and wherein a loader is configured to refuse to load executables not permanently stored in the location which is only accessible to the trusted computing base; and
   policing, by a processor, access to said protected resources at said corresponding servers on the basis of the capabilities assigned to the native executable code;
   wherein for each client-server communication, the kernel passes the client capabilities to said server.

11. The method of claim 10, wherein one of said capabilities grants access to a specific Application Programming Interface (API) (or range of APIs), file or other operating system protected resource(s).

12. The method of claim 10, wherein the executable code is permanently stored in the location which is only accessible to the trusted computing base to preserve the integrity of the capabilities assigned to the executable code.

13. The method of claim 12, wherein the loader is configured to refuse to load executables not permanently stored in the location which is only accessible to the trusted computing base to preserve the integrity of the system.

14. The method of claim 10, wherein the capabilities include system capabilities which are mandatory and control access to the kernel, file system and system data.

15. The method of claim 10, further comprising, in an instance in which an executable has requested to load a library:
   verifying that the library is assigned a superset of the capabilities granted to the requesting executable; and
   only granting the request to load the library in an instance in which the library is assigned a superset of the capabilities granted to the requesting executable.

16. The method of claim 10, in which a capability is selected from a list of capabilities which comprise root capabilities, system capabilities and user-exposed capabilities.

17. The method of claim 16, in which the user-exposed capabilities allow the following functions:
   (a) can spend subscribers money by using the phone network;
   (b) can read users private information;
   (c) can modify users private information;
   (d) can send information to a local network without spending subscribers money;
   (e) can know the device location.

18. The method of claim 10, wherein one of the servers comprises the kernel.

* * * * *